United States Patent [19]

Horne

[11] Patent Number: 4,463,258
[45] Date of Patent: Jul. 31, 1984

[54] IMAGING APPARATUS

[75] Inventor: David R. Horne, Crowborough, England

[73] Assignee: U.S. Philips Corporation, New York, N.Y.

[21] Appl. No.: 317,106

[22] Filed: Nov. 2, 1981

[30] Foreign Application Priority Data

Nov. 10, 1980 [GB] United Kingdom ............... 8036082

[51] Int. Cl.$^3$ ............................................. H01J 31/49
[52] U.S. Cl. .................................... 250/334; 250/332
[58] Field of Search ............... 358/206; 250/334, 332, 250/347, 349; 350/6.7

[56] References Cited

U.S. PATENT DOCUMENTS 3,626,091 12/1971 Casper ................................. 378/206
4,117,331 9/1978 Wilson et al. ....................... 250/347
4,367,014 1/1983 Howden ............................... 350/320

FOREIGN PATENT DOCUMENTS 1530066 10/1978 United Kingdom.

Primary Examiner—Alfred E. Smith
Assistant Examiner—Carolyn E. Fields
Attorney, Agent, or Firm—Marc D. Schechter

[57] ABSTRACT

Apparatus is described for scanning a scene in bands of lines and reconstructing the scene in visible light. Use is made of a prism having mirrors which subtend a sequence of various tilt angles with an axis of rotation. According to the invention, all but one of the mirrors are used for scanning and reconstruction. To achieve this, the angular spacing between the scanning and reconstruction locations around the prism is an integral multiple of the angular spacing between adjacent mirrors, which multiple is not a sub-multiple of the total number of mirrors. For all but one of the mirrors, the tilt angle of a mirror at a scanning location differs from the tilt angle of the mirror simultaneously present at a reconstruction location by the same amount and in the same direction.

7 Claims, 5 Drawing Figures

IMAGING APPARATUS

BACKGROUND OF THE INVENTION

The invention relates to an apparatus for producing a visible image of a scene by detecting nonvisible radiation from the scene. The apparatus, comprises a mirror prism which is rotatable about an axis and which includes a plurality of planar mirrors. The mirrors form an equiangular polygon in a cross-section through the prism normal to the axis. The mirrors also subtend a sequence of various tilt angles with respect to the axis. An objective lens is arranged in the apparatus to receive radiation from the scene via said planar mirrors. Radiation passes through the lens and is incident on a linear array of radiation-sensitive detectors. A linear array of light sources each source coupled to a corresponding detector in the detector array, is used to construct a visible image of the scene. Finally, viewing means is arranged to receive the light beams reflected by the planar mirrors from the light sources.

In U.S. Pat. No. 3,626,091 (Casper) a thermal imaging apparatus is disclosed comprising a linear array of infrared detectors and a corresponding linear array of light sources. Scanning of a plurality of bands of lines across the scene, and reconstruction in synchronism with the scanning are effected by a rotating mirror prism having planar mirrors set at various angles around the axis of rotation. The mirror prism has twice as many mirror faces as there are bands scanned in the scene. Scanning is carried out by a first set of mirrors while reconstruction is carried out by a second set of mirrors. This results in either bulky mirror prisms or in relatively small aperture mirrors which restrict the sensitivity of the apparatus.

SUMMARY OF THE INVENTION

It is an object of the invention to reduce these restrictions by employing all but one of the mirrors on the prism for both scanning and reconstruction. To this end, in the apparatus according to the invention in that the angular spacing between the scanning and reconstruction locations which are disposed around the prism is equal to an integral multiple of the angle between the normals to adjacent sides of the polygon (formed by the cross-section through the prism, normal to the prism axis of rotation). The multiple is not a submultiple of the number of planar mirrors on the prism. In addition, the difference in tilt angles of the planar mirrors is an integral multiple of half the angular length of the detector array. The sequence of tilt angles is such that, for all planar mirrors but one, the tilt angle of any mirror at the scanning location differs from that of the mirror simultaneously present at the reconstruction location by the half angle as a result, all but one of the planar mirrors take part in the scanning and all but one of the mirrors take part in the reconstruction of an image of the scene. The image of the scene comprises a number of bands one less than the number of planar mirrors.

Methods of manufacturing mirror prisms for use in such imaging apparatus are described in British patent application No. 7942998 (corresponding to U.S. Pat. No. 4,367,014).

It can be operationally convenient if the observer sees the reconstructed scene as though he were looking straight through the apparatus at the original scene, as he would do when using an optical telescope. This can be achieved most readily if the multiple is the nearest value to half the number of planar mirrors so that the scanning and reconstruction locations are nearest to being on opposite sides of the prism.

The selection of different mirror tilt angles results in the reconstructed visible picture being reversed relative to the scene being scanned about a plane at right angles to the axis of rotation. Means may be provided in a viewing eyepiece to correct this reversal. But it may be more convenient to complete the inversion of the image by also providing a reversal of the picture from left to right. A further complete inversion is then provided by an eyepiece system which images the scanner pupil onto the exit pupil. Means may be provided at the reconstruction location for reversing the reconstructed image about a plane parallel to the axis of rotation.

DESCRIPTION OF THE PREFERRED EMBODIMENTS

Figure 1:
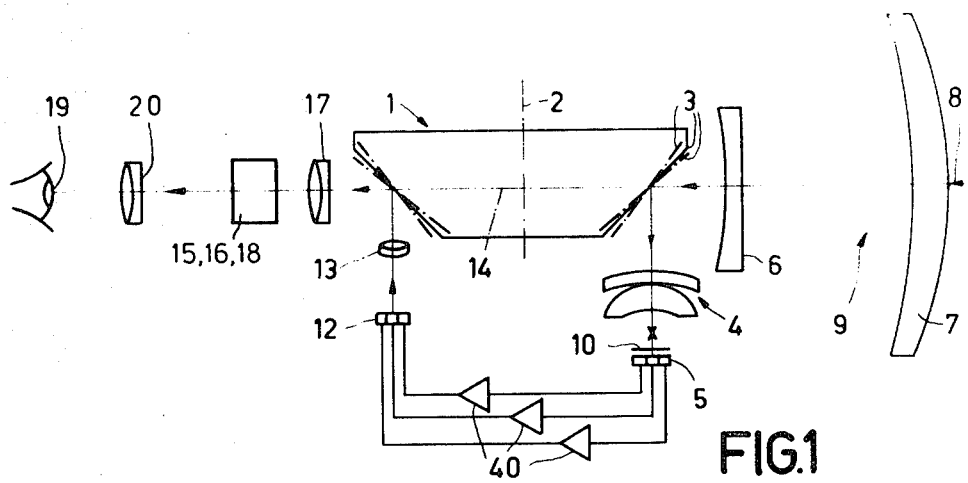
FIGS. 1 and 2 are schematic elevation and plan views, respectively, of a thermal imaging apparatus employing a 9-sided mirror prism.
Figure 2:
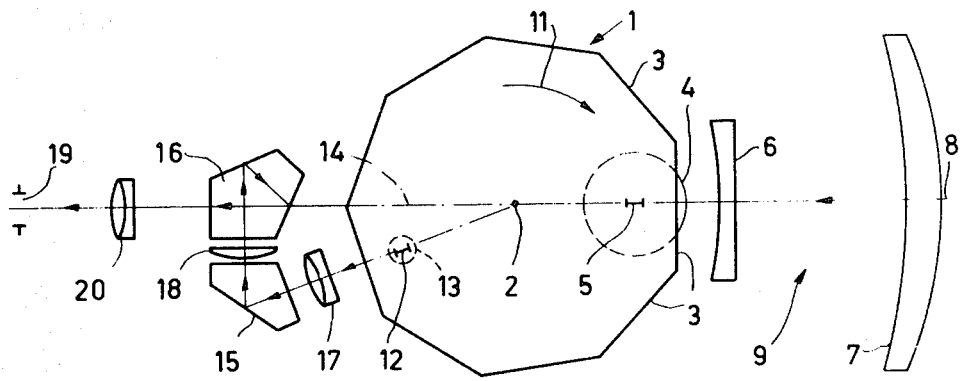

In FIGS. 1 and 2 the chief ray 8 of a beam of infrared radiation is shown entering the apparatus from a point in the scene in the center of the field of view. An afocal Galilean telescope 9 may be employed to provide scene magnification by a factor of between 2 and 3. The telescope comprises a positive silicon lens 7 and a negative germanium lens 6 as described in British Pat. No. 1,530,066.

The beam of infrared radiation, after passing through lenses 6 and 7, is reflected by a planar mirror 3 of a rotatable mirror prism or mirror assembly 1. The reflected beam is substantially parallel to the axis of rotation 2 of the mirror prism. An objective lens 4 at the scanning location forms an image 10 of the scene in the plane of a linear array of infrared detectors 5. Detectors 5 are aligned along a radius extending from the axis of rotation 2. Rotation, in the direction of the arrow 11 (FIG. 2) of the prism about axis 2 causes the image 10 to be moved transversely across the linear array 5, thus scanning a band of lines in the image 10.

The rotational motion of mirror 3 also causes rotation of the image 10 in its own plane by an angle equal to the scan angle. Due to the limited angle of rotation of the mirror 3 for each scan, the scene distortion produced is relatively minor and, as will be explained later, this is largely compensated by a corresponding rotation produced during image reconstruction using another mirror 3.

The mirror prism 1 according to the illustrated embodiment of the invention has nine planar mirrors 3 set at equal angles about the axis 2, so that any cross-section through the prism normal to axis 2 takes the shape of an equiangular polygon. In particular, the section through the centers of mirrors 3 has the shape of the regular polygon of FIG. 2.

Figure 5:
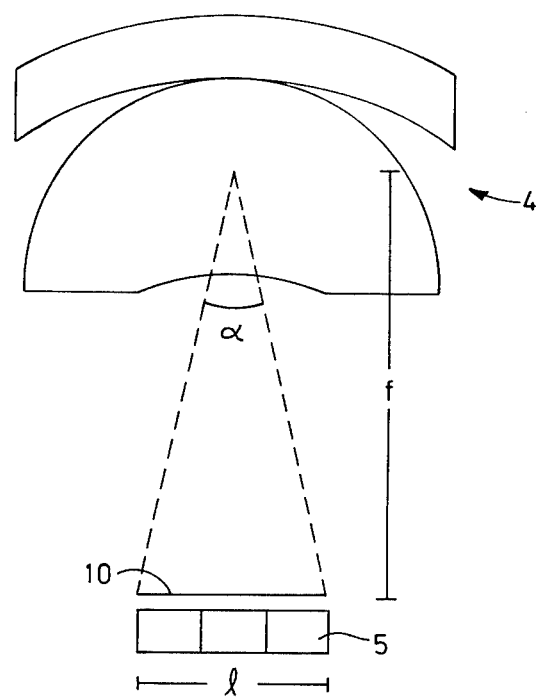
FIG. 5 is an enlarged schematic plan view of a portion of the thermal imaging apparatus of FIG. 1.

The mirrors 3 are generally set at an angle of 45 degrees to axis 2, though each mirror 3 has a small additional angle of tilt away (from 45 degrees) which is different for each mirror 3. The difference in tilt angle between any two mirrors 3 is an integral multiple of half the angular length of the linear array 5. The angular length, d, of the array is equal to the linear length l, of the array divided by the focal length, f, of the objective lens 4. (FIG. 5.) Thus, between the scans produced by two mirrors 3 having a tilt difference equal to half of the angular length, the image 10 is shifted along the array 5 by the full length of the array, so that the bands in the image 10 scanned by these two mirrors are contiguous. In an example where the angular length of the array is 2 degrees, the sequence of mirror angles is given by the following table.

| Mirror No. | Mirror | Angle |
| --- | --- | --- |
| 1 | 41° | 30' |
| 2 | 43° | 30' |
| 3 | 45° | 30' |
| 4 | 47° | 30' |
| 5 | 49° | 30' |
| 6 | 42° | 30' |
| 7 | 44° | 30' |
| 8 | 46° | 30' |
| 9 | 48° | 30' |

Thus in one complete rotation of the prism nine contiguous bands are scanned in two interlaced groups of bands, the odd numbered bands being scanned first, followed by the even numbered bands.

To reconstruct a visible version of the scene, a linear array 12 of light sources, aligned along a radius extending from the axis of rotation 2, is provided at a reconstruction location. Each light source is coupled, by an amplifier 40, to a corresponding detector in the detector array 5. For simplicity, in FIGS. 1 and 4 only three detectors, amplifiers and sources are shown.

Each light source produces a light beam modulated according to the radiation beam received by the corresponding detector. Lens 13 collimates light beams from the sources so that they are substantially parallel to axis 2. These beams are subsequently reflected by a mirror 3. Lens 13 also presents the light source array 12 to the viewing optics at an angular length equal to that of the detector array 5, so that the reconstructed visible bands are contiguous.

Since the normals to adjacent faces of the nine sided polygon (formed by taking a cross-section through the mirror prism 1 normal to its axis of rotation) are inclined at 40° to one another, the reconstruction location is off-set from the apparatus axis 14 (FIG. 2) by an angle of 20°. Consequently, as one mirror 3 passes through the scanning location another mirror 3 synchronously passes through the reconstruction location.

To realign the viewing line of sight so that it is along the axis 14, a pair of prisms 15 and 16 are used. These prisms, by providing three reflections of the visible image in the horizontal plane, also reverse the visible picture from left to right. As will be described in detail below, the sequence of mirror tilt angles given in the above table results in the reconstructed picture being reversed top to bottom. Consequently there is one complete inversion of the visible image due to these two reversals.

The ideal position for the pupil of the observer's eye to avoid vignetting would be at the surface of mirror 3 at the scanning location. Lenses 17 and 18 image the scanning location onto the apparatus exit pupil 19, for practical viewing, and produce another inversion of the image so that the reconstructed scene is viewed erect. Eyepiece lens 20 restores the overall magnification to unity and provides eye diopter adjustment.

Figure 3:
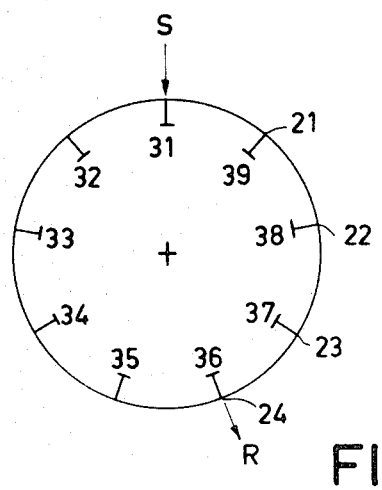
FIG. 3 schematically shows the location of the scanning and reconstruction locations around the mirror prism.

The procedure for selecting the angular separation of the scanning and reconstruction locations and the associated set of mirror tilt angles in relation to the number of mirrors on the prism will first be described in relation to the nine sided prism example given above. Referring to FIG. 3, of the nine possible locations around the prism, one is occupied by the scanning location S. Of the remaining eight possible locations for the reconstruction location, only the four locations 21, 22, 23 and 24 are of interest, the other four locations being merely mirror images of these four. In the above embodiment, the reconstruction location R is chosen to be at location 24, so that the scanning and reconstruction locations are separated by 4 locations and are nearest to being on opposite sides of the prism.

In FIG. 3, the nine mirrors 31 to 39 of the prism are shown with mirror 31 at S and mirror 36 at R. If the tilt angle of mirror 31 is set at 41° 30' to the plane of rotation to scan the lowest band in the scene, the tilt angle of mirror 36 must be chosen to be 1° greater at 42° 30' (1° being half the angular length of the detector array). As shown in the ray diagram of FIG. 4, this results in this lowest band of the scene being reconstructed as the highest band in the image (12' being the virtual image of light source array 12 in mirror 36).

When the prism has rotated so that mirror 36 is at S to scan the next band from the bottom in the scene, mirror 32 is then at R and its tilt angle must be set at 43° 30' so that this band will be reconstructed as the next band from the top. When mirror 32 is at S, mirror 37 is at R and its tilt angle must be 44° 30'. In this way all nine mirror tilt angles are selected.

Since the separation between the S and R locations is 4 locations and is not a sub-multiple of the 9 possible locations, each mirror face is considered for selection once only during the nine steps of the process. Thus the tilt angles for all 9 mirrors can be selected unambiguously. If the reconstruction location had been placed at location 23, i.e. 3 locations separated from S, after only three steps of the process a mirror tilt angle already selected would reappear for selection at a different angle, rendering it impossible to select an angle sequence for all nine mirrors. If the prism has a prime number of mirrors it will always be possible to select the angle sequence for the mirrors, regardless of the separation of S and R. An exception to the nonsubmultiple rule is when S and R are adjacent. The sequence is then selectable regardless of the number of mirrors. But it will usually be the case that having S and R adjacent is mechanically and optically inconvenient. Within the rule, given above, odd or even numbers of mirrors may be used.

Thus, in general, the scanning and reconstruction locations are defined by a number, x, which represents the number of planar mirrors which pass through the scanning location during rotation of the mirror assembly to move one planar mirror from the scanning location to the reconstruction location. In FIG. 3, x is equal to 4, because four planar mirrors (mirrors 31, 32, 33, and 34) pass through the scanning location when the mirror assembly is rotated clockwise to move mirror 31 from the scanning locations to the reconstruction location R.

According to the invention, the number x (defining the relationship between scanning and reconstruction locations) is chosen such that there is no positive integer, m, less than the number, n, of planar mirrors in the mirror assembly where rotation of the mirror assembly to pass mx mirrors through the scan location will terminate with the same mirror at the scan location as the mirror at the scan location at the start of the rotation.

The direction of rotation of the prism is immaterial. The direction of rotation only effects the order in time in which the bands are scanned.

When the final tilt angle in the sequence has been chosen to be correct at the reconstruction location (mirror 35 at 49° 30' in the above example), this final mirror will then be paired with the first mirror in the sequence (mirror 31 at 41° 31'). Thus, when the final mirror is at the scan location and the first mirror is at the reconstruction location, this final band is not reconstructed at the correct location in the image and it cannot be used. Means are provided, coupled to the rotational position of the prism, to switch off the light sources as this final mirror (mirror 35) passes through the scanning location.

The tilts of the mirrors are made about axes half-way between the top and bottom faces of the prism. This is done in order to minimize the disturbance to the dynamic balance of the prism about axis 2.

A greater number of bands may be obtained by having a greater number of mirrors on the prism. But for a given overall size of the prism, each mirror face will then be smaller. Less radiation will be intercepted by each mirror and the apparatus sensitivity will be reduced.

Figure 4:
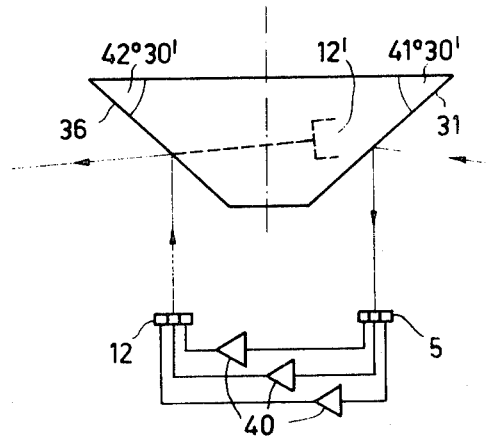
FIG. 4 schematically shows the top to bottom reversal of the reconstructed visible picture.

Referring to FIG. 4, it will be seen that the selection of the tilt angles such that the tilt angle of any mirror at the scanning location differs from that of the mirror simultaneously present at the reconstruction location by half the angular length of the array, also causes the band structure of the reconstructed picture to be inverted top-to-bottom. By choosing the appropriate order of connection (via amplifiers 40 shown in FIGS. 1 and 4) between the detectors and the light sources, the details within the band can also be inverted top to bottom to correctly reconstruct the whole picture.

The linear detector array and the rotating mirror prism cause the scene to be scanned along a nominally vertical line. In fact, as well as being moved through the range of azimuths, this line is also rotated away from the vertical through an angle equal to the scan angle. This might cause visible distortions were the image to be presented, for example, on a CRT display. However, in a symmetrical direct view system, such as that described, an equal and opposite rotation at the reconstruction location occurs and the image of the scene is not distorted.

The imaging apparatus has been described in relation to thermal infra red radiation. It will be clear, that the general purpose of the apparatus is to render visible a scene scanned with non-visible radiation. This radiation may be of different wavelengths, shorter or longer than that of visible light, and may, for example, be ultraviolet radiation, infra red radiation of wavelength longer than 10 microns, or even short wavelength microwave radiation. The scene may be either naturally radiant at these wavelengths or may be irradiated by a corresponding radiation source.

The mirror prism as described has the mirror faces set generally at an angle to the axis of rotation so that the reflected radiation is parallel to the axis. This can result in a compact apparatus. But the invention is equally applicable to mirror prisms in which the mirror faces are generally parallel to the axis of rotation. Such a prism might be used if it is desired to remove the image rotation effect described above.

I claim:

1. An apparatus for producing a visible image of a scene by sensing non-visible radiation from the scene, said apparatus comprising:
   a mirror assembly which is rotatable about an axis, said assembly comprising a number, n, of planar mirrors disposed equiangularly around the periphery thereof, each planar mirror subtending a different tilt angle with respect to the axis, a cross-section through the mirror assembly in a plane perpendicular to the axis taking the shape of a regular polygon;
   an objective lens arranged to receive radiation from the scene after the radiation is reflected by a planar mirror which is at a scanning location, said lens having a focal length;
   a linear array of radiation-sensitive detectors arranged to receive radiation from the scene which is reflected by a planar mirror at the scanning location and which passes through the objective lens, said array having a linear length and an angular length, the angular length being equal to the linear length of the array divided by the focal length of the objective lens;
   a linear array of light sources arranged to emit light onto a planar mirror at a reconstruction location, each light source being coupled to one corresponding detector of the detector array; and
   viewing means arranged to receive light reflected by the planar mirror at the reconstruction location from the light sources;
   characterized in that;
   the scanning and reconstruction locations are selected such that during rotation of the mirror assembly to move a planar mirror from the scanning location to the reconstruction location, an integral number, x, of planar mirrors pass through the scanning location, the number, x, being chosen such that there is no positive integer, m, less than n where rotation of the mirror assembly to pass mx mirrors through the scan location will terminate with the same mirror at the scan location as the mirror at the scan location at the start of the rotation; and
   the differences between the tilt angles of the planar mirrors are integral multiples of half of the angular length of the detector array, the differences between the tilt angles of pairs of planar mirrors at the scanning and reconstruction locations, being equal to half the angular length of the detector array for all but one pair of mirrors.

2. An apparatus as claimed in claim 1, characterized in that x is as close as possible to n/2, so that the scanning and reconstruction locations are nearest to being on opposite sides of the mirror assembly.

3. An apparatus as claimed in claim 2, characterized in that:
   the light from the light sources forms a visible image; and
   the viewing means further comprises means for reversing the visible image about a plane parallel to the axis of rotation of the mirror assembly.

4. An apparatus for producing a visible image of a scene by sensing non-visible radiation from the scene, said apparatus comprising;

a mirror assembly which is rotatable about an axis, said assembly comprising a number, n, of planar mirrors disposed equiangularly around the periphery thereof, each planar mirror subtending a different tilt angle with respect to the axis, a cross-section through the mirror assembly in a plane perpendicular to the axis taking the shape of a regular polygon;

a linear array of radiation-sensitive detectors arranged to receive radiation from the scene which is reflected by a planar mirror at a scanning location; and a linear array of light sources arranged to emit light onto a planar mirror at a reconstruction location, each light source being coupled to one corresponding detector of the detector array;

characterized in that the scanning and reconstruction locations are selected such that during rotation of the mirror assembly to move a planar mirror from the scanning location to the reconstruction location, an integral number, x, of planar mirrors pass through the scanning location, the number, x, being chosen such that there is no positive integer, m, less than n where rotation of the mirror assembly to pass mx mirrors through the scan location will terminate with the same mirror at the scan location as the mirror at the scan location at the start of the rotation.

5. An apparatus as claimed in claim 4, characterized in that x is greater than 1.

6. An apparatus as claimed in claim 5, characterized in that x is as close as possible to n/2, so that the scanning and reconstruction locations are nearest to being on opposite sides of the mirror assembly.

7. An apparatus as claimed in claim 6, characterized in that x=4 and n=9.

* * * * *